United States Patent
Henrici et al.

(10) Patent No.: US 11,774,109 B2
(45) Date of Patent: Oct. 3, 2023

(54) COOKING DEVICE WITH HOLDING PLATE FOR A COOKING DEVICE LIGHT

(71) Applicant: BJB GmbH & Co. KG, Arnsberg (DE)

(72) Inventors: Philipp Henrici, Arnsberg (DE); Olaf Baumeister, Sundern (DE); Frank Welslau, Arnsberg (DE)

(73) Assignee: BJB GmbH & Co. KG, Arnsberg (DE)

( * ) Notice: Subject to any disclaimer, the term of this patent is extended or adjusted under 35 U.S.C. 154(b) by 3 days.

(21) Appl. No.: 17/536,003

(22) Filed: Nov. 27, 2021

(65) Prior Publication Data
US 2022/0235942 A1 Jul. 28, 2022

(30) Foreign Application Priority Data
Jan. 26, 2021 (DE) .................. 102021101699.1

(51) Int. Cl.
| | |
|---|---|
| *F24C 15/00* | (2006.01) |
| *A21B 3/10* | (2006.01) |
| *H05B 6/64* | (2006.01) |
| *F21V 8/00* | (2006.01) |
| *F21W 131/307* | (2006.01) |

(52) U.S. Cl.
CPC ............ *F24C 15/008* (2013.01); *A21B 3/10* (2013.01); *G02B 6/0005* (2013.01); *H05B 6/6444* (2013.01); *F21W 2131/307* (2013.01)

(58) Field of Classification Search
CPC .. A21B 3/10; F21W 2131/307; F24C 15/008; H05B 6/6444
See application file for complete search history.

(56) References Cited

U.S. PATENT DOCUMENTS
| | | |
|---|---|---|
| 3,334,215 A | 8/1967 | Allen, Jr. |
| 2005/0259931 A1 | 11/2005 | Gaydoul |

FOREIGN PATENT DOCUMENTS
| | | | |
|---|---|---|---|
| CN | 106871019 A | 6/2017 | |
| DE | 202006001187 | 4/2006 | |
| DE | 102014203532 A1 | 8/2015 | |
| DE | 202015104575 U1 | 11/2019 | |
| DE | 202019106169 U1 | 11/2019 | |
| DE | 202019106170 U1 | 11/2019 | |
| DE | 202019106170 U1 * | 1/2020 | ................ F21S 8/00 |
| WO | WO2013/098018 A1 | 4/2006 | |

* cited by examiner

*Primary Examiner* — Sean P Gramling
(74) *Attorney, Agent, or Firm* — Von Rohrscheidt Patents

(57) ABSTRACT

A cooking appliance including a cooking cavity defined by a cooking cavity wall; a cut out provided in the cooking cavity wall; a cooking appliance light arranged in the cut out and configured to illuminate the cooking cavity; and a support plate including a receiving opening for the cooking appliance light, wherein the cooking appliance light is supported in the receiving opening, wherein the support plate fixes the cooking appliance light in the cut out, wherein the support plate including the cooking appliance light closes the cut out in the cooking cavity wall, wherein the cooking appliance light includes a LED illuminant and a light conductor rod, wherein the light conductor rod is supported in the cut out in the cooking cavity wall.

9 Claims, 10 Drawing Sheets

COOKING DEVICE WITH HOLDING PLATE FOR A COOKING DEVICE LIGHT

RELATED APPLICATIONS

This application claims priority from and incorporates by reference German Patent Application DE 10 2021 101 699.1 filed on Jan. 26, 2021.

FIELD OF THE INVENTION

The invention relates to a cooking appliance including a cooking appliance light.

BACKGROUND OF THE INVENTION

Cooking devices are known in the art configured as ovens, steam cookers, microwave ovens or other devices for home use and commercial use. They are used for preparing foods and include a cooking cavity that is formed by a so-called muffle and its walls, thus the muffle walls or the cooking cavity walls.

In order to be able to watch and assess the cooking process, cooking devices include lighting as described e.g. in DE 50 2006 001 187 owned by applicant. Lights of this type are arranged in pass through openings of the cooking cavity wall that are introduced into the cooking cavity wall during fabrication of the muffle.

The muffle is typically made from plural metal components. Muffle elements are stamped from sheet metal.

Tools and equipment for fabricating muffle elements are quite expensive so that manufacturing of cooking devices strive to sufficiently load the tooling by using the same muffle in various types and models of appliances.

Recent developments in illumination technology have led to an increased use of cooking cavity lights that are based on LED modules that provide high energy saving potential and thus improve energy efficiency of cooking appliances. However specific requirements of LED lighting technology led to new cooking cavity lights that have different configurations, installation dimensions and arrangement requirements in the cooking appliance. In particular temperature sensitivity of the LED light source has the effect that the LED light source has to be arranged at a significantly larger distance from the cooking cavity and that the emitted light is typically conducted into the cooking cavity through a light conductor. This has the effect that oven muffles with accordingly configured wall openings are developed for using LED based cooking appliance lights for conducting the light into the cooking cavity and existing production tooling has to be adapted or replaced. This is detrimental from an economic and environmental point of view.

BRIEF SUMMARY OF THE INVENTION

Thus, it is an object of the invention to provide a microwave oven with an LED based cooking appliance light using an opening in the cooking cavity wall that is configured for conventional lights.

The object is achieved by A cooking appliance including a cooking cavity defined by a cooking cavity wall; a cut out provided in the cooking cavity wall; a cooking appliance light arranged in the cut out and configured to illuminate the cooking cavity; and a support plate including a receiving opening for the cooking appliance light, wherein the cooking appliance light is supported in the receiving opening, wherein the support plate fixes the cooking appliance light in the cut out, wherein the support plate including the cooking appliance light closes the cut out in the cooking cavity wall, wherein the cooking appliance light includes a LED illuminant and a light conductor rod, wherein the light conductor rod is supported in the cut out in the cooking cavity wall.

Thus, the cut out in the cooking cavity wall has a first opening dimension, the receiving opening of the mounting plate, however has a second opening dimension that is reduced relative to the first opening dimension.

The invention is characterized in particular by the mounting plate described supra which adapts the mounting contour and mounting position defined by the opening in the cooking cavity wall for using an LED illuminant. This way neither the cooking cavity wall which is part of the muffle has to be adapted to modern LED based cooking appliance lights nor efforts have to be made to redesign cooking appliance lights which have been developed to use advantageous LED technology so that the LED cooking appliance lights are adapted to existing cooking appliance walls that are still configured for conventional lights.

Thus, the mounting plate according to the invention facilitates a continued use of production tooling that is configured for producing components for conventional illumination until tooling has to be acquired e.g. due to wear which goes hand in hand with a change in tooling. Simultaneously illuminants adapted to new requirements can be used without redesign, thus the mounting plate facilitates a seamless and soft transition from conventional technology to new technology.

Typically the cut outs in the cooking cavity wall include grooves. With conventional illuminants the grooves typically secure the lamp socket against rotation in order to be able to rotate a glass cover relative to a socket housing and remove the glass cover for replacing the illuminant. The invention proposes to use this groove as a positioning groove in order to assure a defined orientation of the mounting plate. Thus, the mounting plate forms a positioning lug that engages the positioning groove.

In an advantageous embodiment the mounting plate, in particular the positioning lug of the mounting plate includes at least one interlocking lug that reaches behind the cooking cavity wall, in particular when the mounting plate includes at least one mounting base that reaches behind the cooking cavity wall.

This way it is assured that the mounting plate is easily insertable into an existing cutout in the cooking cavity wall and that the mounting plate is securely retained therein.

Advantageously the mounting plate includes an alignment contour for correctly positioning the cooking appliance light in the mounting plate. This assures that the LED based cooking appliance light is installed in the cooking cavity wall with a correct orientation through the cooperation of positioning groove and positioning lug. This is an essential prerequisite for light fed into the cooking cavity to be radiated in a defined manner e.g. by coating the light conductor.

From a fabrication point of view it is advantageous when the mounting plate is configured as a stamped component in which the mounting base and the positioning lug are bent from the material of the mounting plate.

The cooking appliance light advantageously includes a mounting socket that fixes the cooking appliance light in the mounting plate.

In order to prevent an exit of cooking gases through the cut out in the cooking cavity wall an elastic element is arranged between the mounting socket and the mounting plate wherein the elastic element has a sealing effect.

Alternatively, the mounting plate is provided with a seal element with a receiver for the light conductor rod of the cooking cavity light. The seal element prevents an exit of cooking gasses from the cooking cavity but also supports the cooking cavity light.

In particular the mounting plate is provided annular and includes two mounting bases and a positioning lug wherein the mounting bases and the positioning lug are respectively circumferentially offset by approximately 120 degrees.

BRIEF DESCRIPTION OF THE DRAWINGS

The invention is subsequently described in more detail based on two embodiments with reference to drawing figures, wherein.

DETAILED DESCRIPTION OF THE INVENTION

Figure 11:
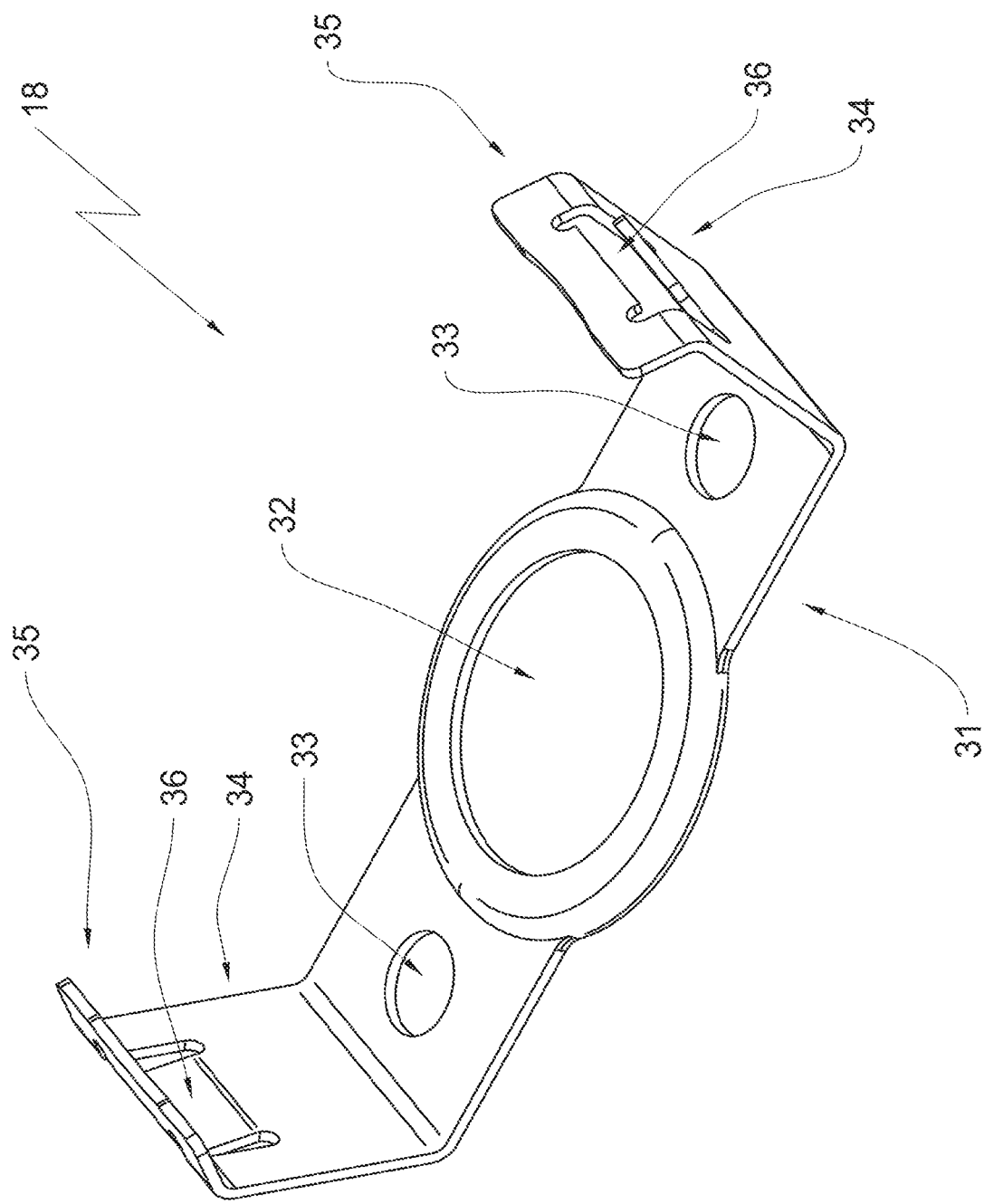
FIG. 11 illustrates a perspective view of the mounting bracket shown in FIG. 1.
Figure 12:
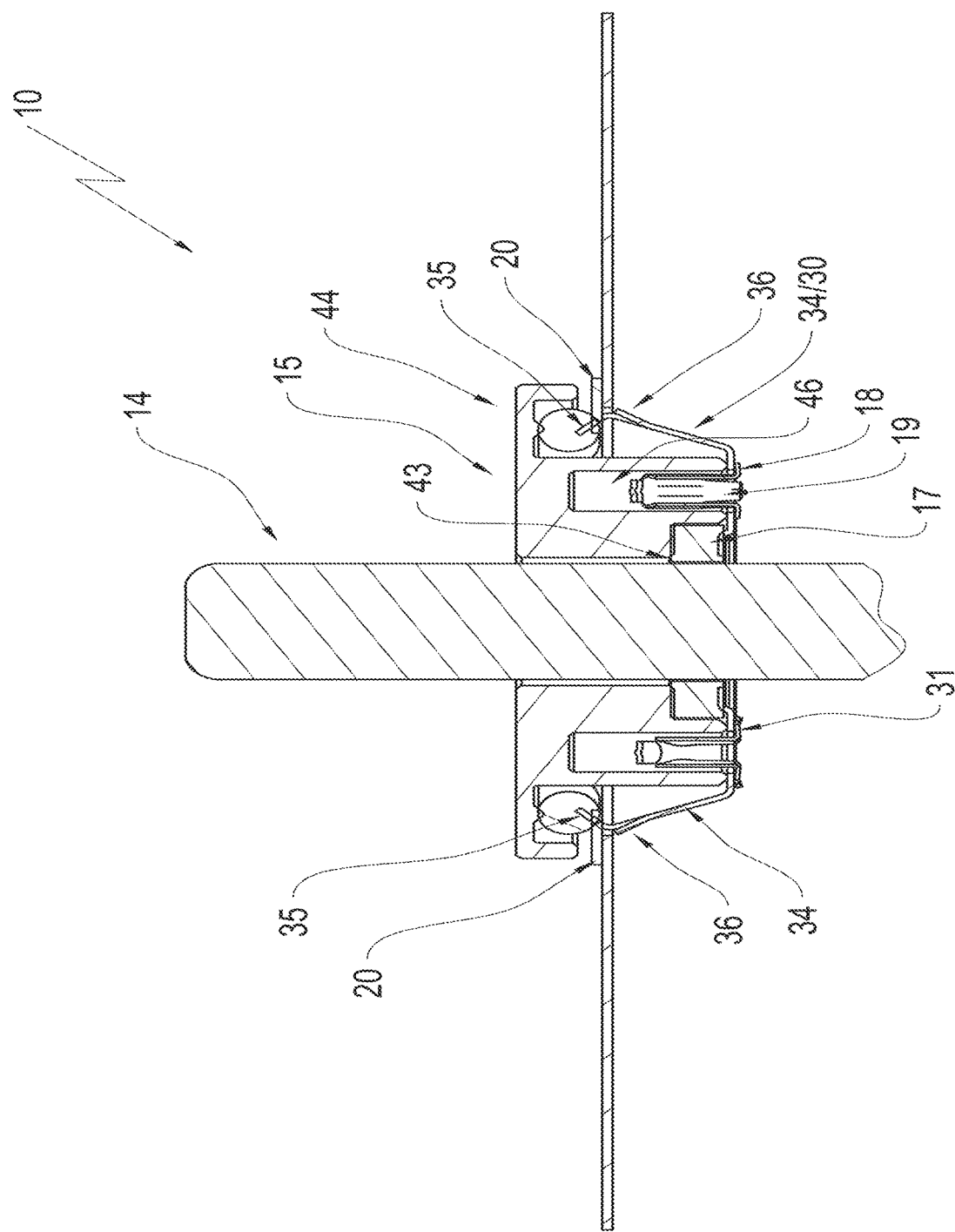
FIG. 12 illustrates a sectional view according to the section line XII-XII in FIG. 2.

The drawing figures show an arrangement of a cooking appliance light in a cooking cavity wall section overall designated with the reference numeral 10 and shown in FIGS. 1-5 in a first embodiment and in FIGS. 6-10 in a second embodiment. FIGS. 11-12 show additional components of the first or second embodiment of the invention. Only components essential for the particular embodiment are shown.

Figure 1:
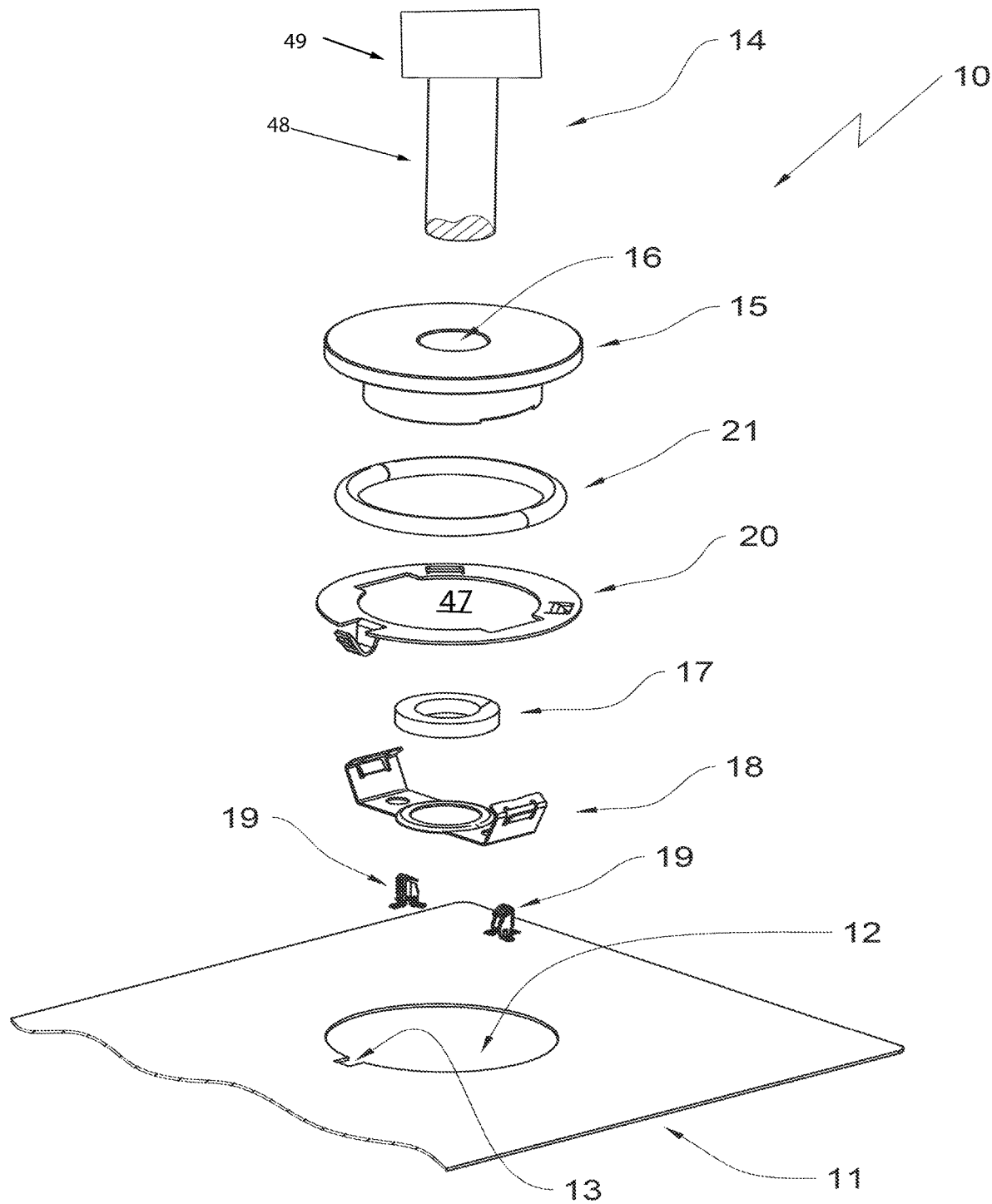
FIG. 1 illustrates a first embodiment of the cooking appliance light in an exploded view.

FIG. 1 illustrates the arrangement 10 with a section of a cooking cavity wall 11 of a cooking appliance. The cooking cavity wall 11 includes a cut out 12 that is substantially circular and that forms a positioning groove 13.

FIG. 1 shows the light conductor rod 14 of the cooking appliance light 48. A LED module 49 including support and cooling element that introduces light into the light conductor rod 14 is attached at the light conductor rod.

The mounting socket 15 includes a bore hole 16 that penetrates the mounting socket 15 and that is used for receiving the light conductor rod 14. The mounting socket 15 supports a graphite ring 17 that seals relative to the light conductor rod 14 and which is supported at the mounting base 15 by a mounting bracket 18. The mounting bracket 18 is fixed at the mounting socket 15 by retaining pins 19.

A support plate 20 receives the mounting socket 15 with a sealing elastic element 21 arranged between the support plate and the mounting socket so that the mounting socket 15 is supported in the cut out 12 of the cooking cavity wall 11.

Figure 4:
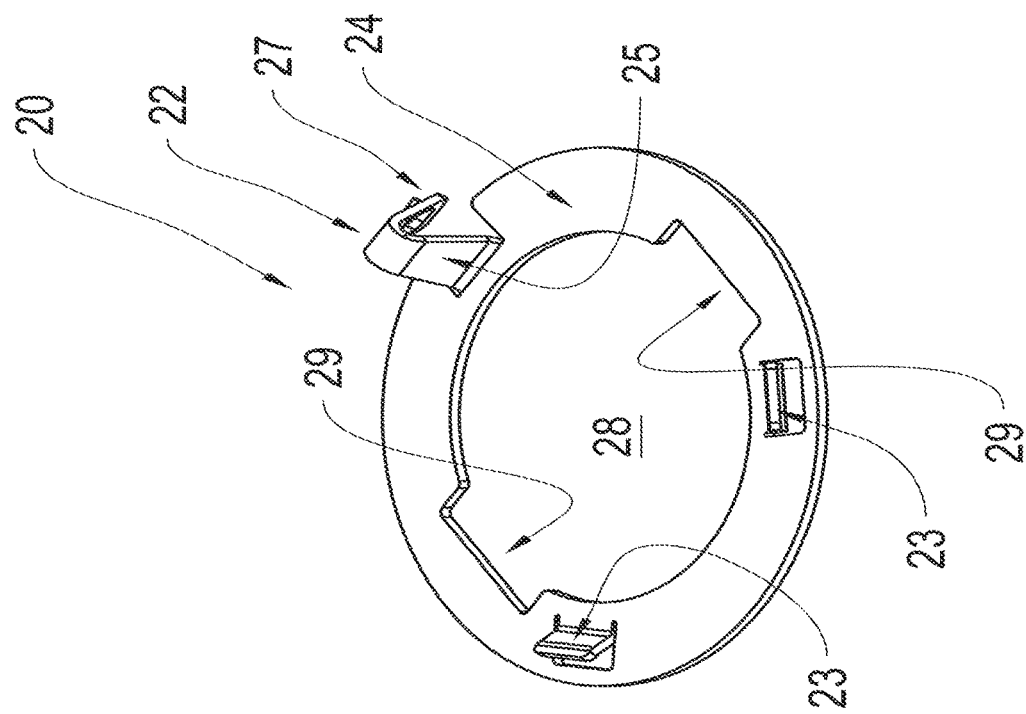
FIG. 4 illustrates a mounting plate in a perspective view of a top side.
Figure 5:
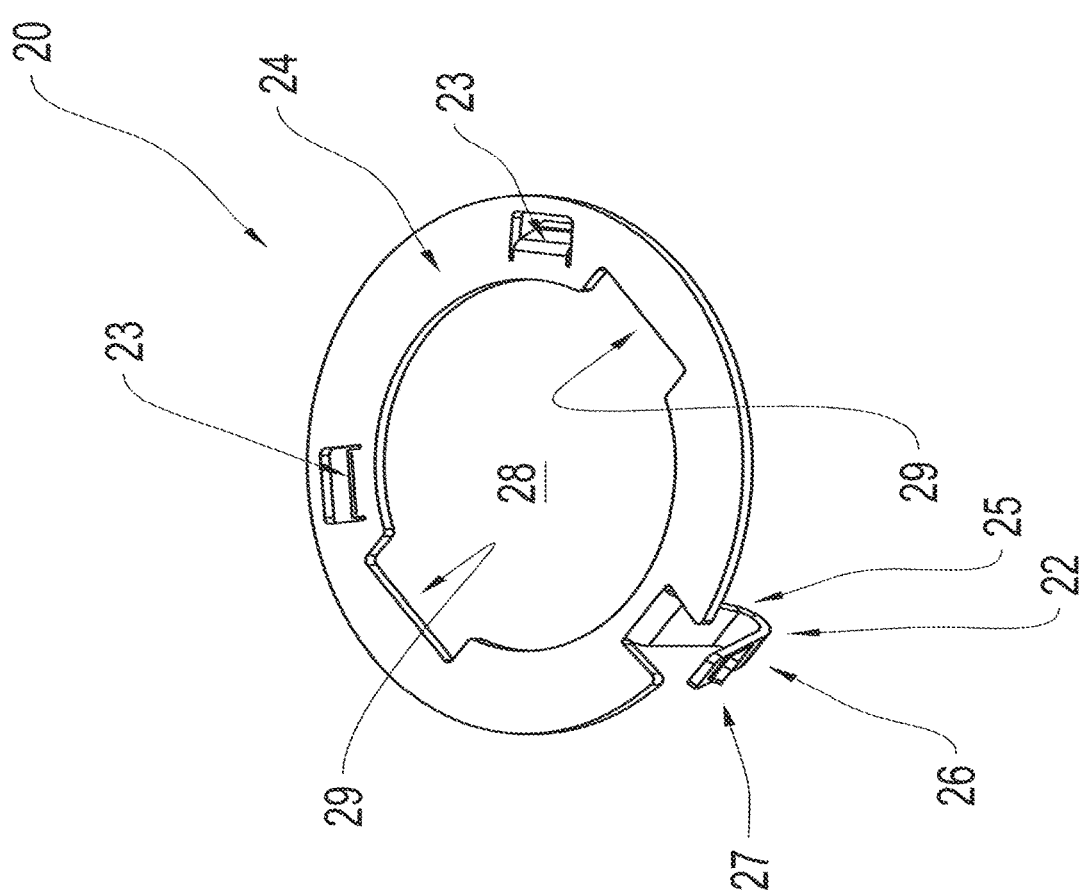
FIG. 5 illustrates the mounting plate according to FIG. 4 in a perspective view of a bottom side.

The support plate 20 is shown in a perspective top view in FIG. 4 and in a perspective bottom view in FIG. 5. The support plate 20 is annular. Its diameter is larger than the diameter of the cut out 12 of the cooking cavity wall 11 in order to be able to cover the cut out 12.

The support plate 20 includes a receiving opening 47 and a positioning lug 22 and forms two retaining bases 23 that are bent out of the annular wall 24 of the support plate 20 in identical directions toward a bottom side of the support plate 20 in the embodiment according to FIGS. 4 and 5.

The positioning lug 22 is configured substantially V-shaped, wherein an originating arm 25 connected to the support plate 20 extends downward relative to the support plate 20 and transitions at its lowest point through a connection arc into a positioning arm 26. The positioning arm 26 itself is oriented in a direction towards a top side of the support plate 20, wherein a free end of the positioning arm 26 extends at least into a plane of the annular wall 24 of the support plate 20, but the positioning arm 26 can also penetrate the annular wall 24 of the support plate 20 in upward direction.

Furthermore, the positioning arm 26 includes an interlocking lug 27 that is bent radially outward and that provides attachment by reaching behind the cooking cavity wall 11.

The annular wall 24 of the support plate 20 forms an annular cavity 28 that receives the mounting socket 15. Thus, the annular cavity 28 is the receiving opening of the support plate 20. Additionally, the annular cavity 28 respectively transitions into an alignment contour 29 in the first embodiment at two diametrically apposed sections. The alignment contour 29 is formed congruent to alignment devices 30 of the mounting socket 15 described infra and thus facilitates defined positioning the mounting socket 15 in the support plate 20.

An origin of the mounting bases 23 as well as the origin of the originating arm 25, thus the respective root that ties the mounting bases 23 or the positioning lug 22 to the annular wall 24 of the support plate 20 are arranged on a common radius. This radius is slightly reduced relative to the radius of the cut out 12 of the cooking cavity wall 11 so that the root of the mounting bases 23 and the root of the originating arm 25 are arrangeable within the cut out 12. The free ends of the mounting bases 23 are arranged on an accordingly larger radius so that they can reach behind or below the cooking cavity wall 11 on a side that is opposite to the support plate 20.

FIG. 11 shows the attachment bracket 18 by itself. The attachment bracket 18 includes a base bar 31 that includes a central pass-through opening 32 for the light conductor rod 14 and a respective retaining pin opening 33 on a right side and a left side of the pass-through opening 32.

Figure 3:
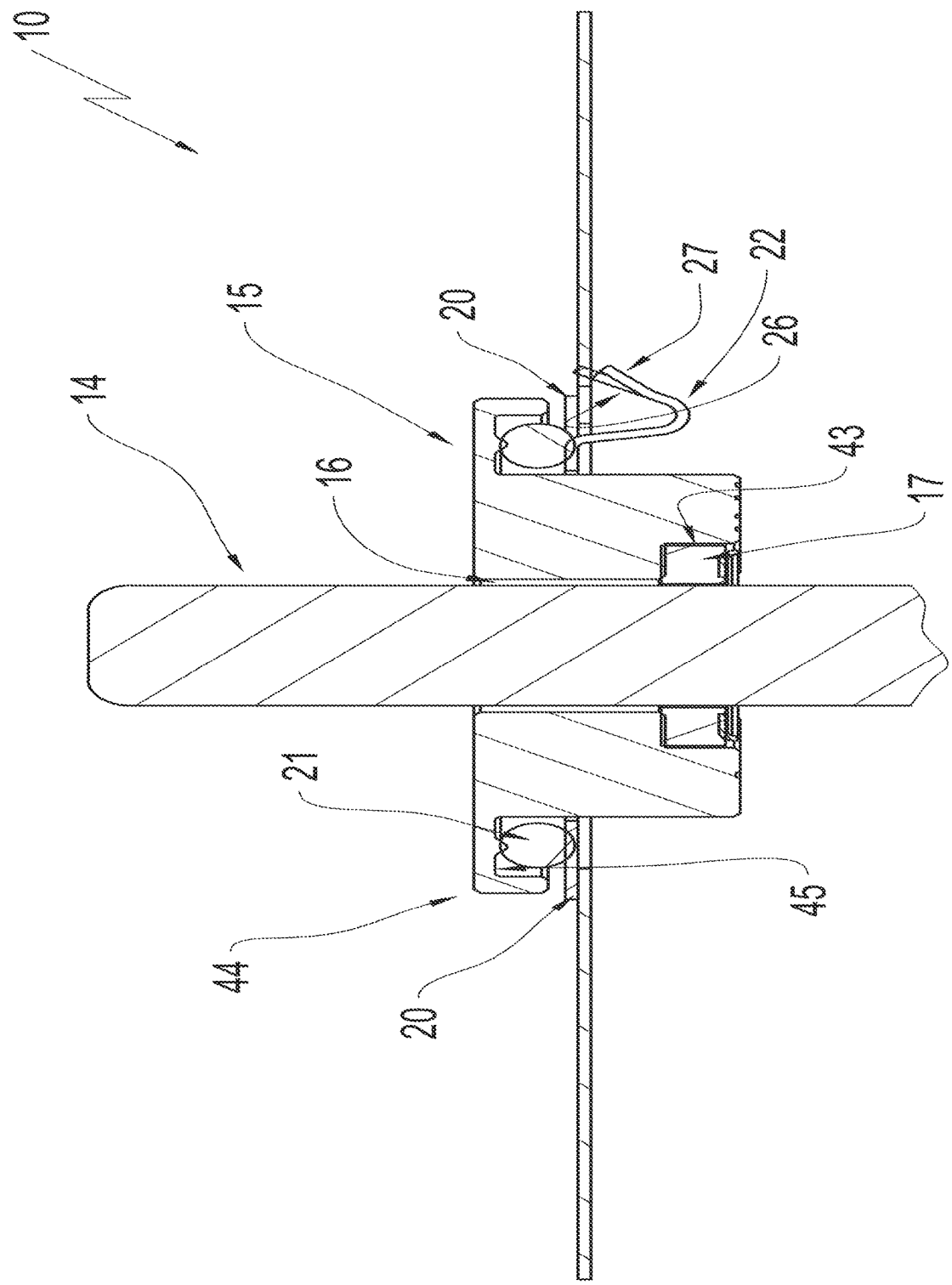
FIG. 3 illustrates a sectional view according to sectional line in FIG. 2.

The base bar 31 fixes the graphite ring 17 in a mounting bracket 43 of the mounting socket 15 as illustrated in FIGS. 3 and 12. The base bar respectively includes an interlocking arm 34, wherein the interlocking arms 34 are bent funnel shaped from their root at the base bar 31. Each interlocking arm 34 is bent at its free end against the deflection direction. These formed ends respectively form a centering and interlocking section 35. Directly in front of a bending line that defines a transition into the centering and interlocking section 35, a reset elastic fixing base 36 is bent outward from each interlocking arm 34, wherein a free end of fixing base 36 is arranged approximately at a level of the bending line of the respective fixing base 36.

Figure 2:
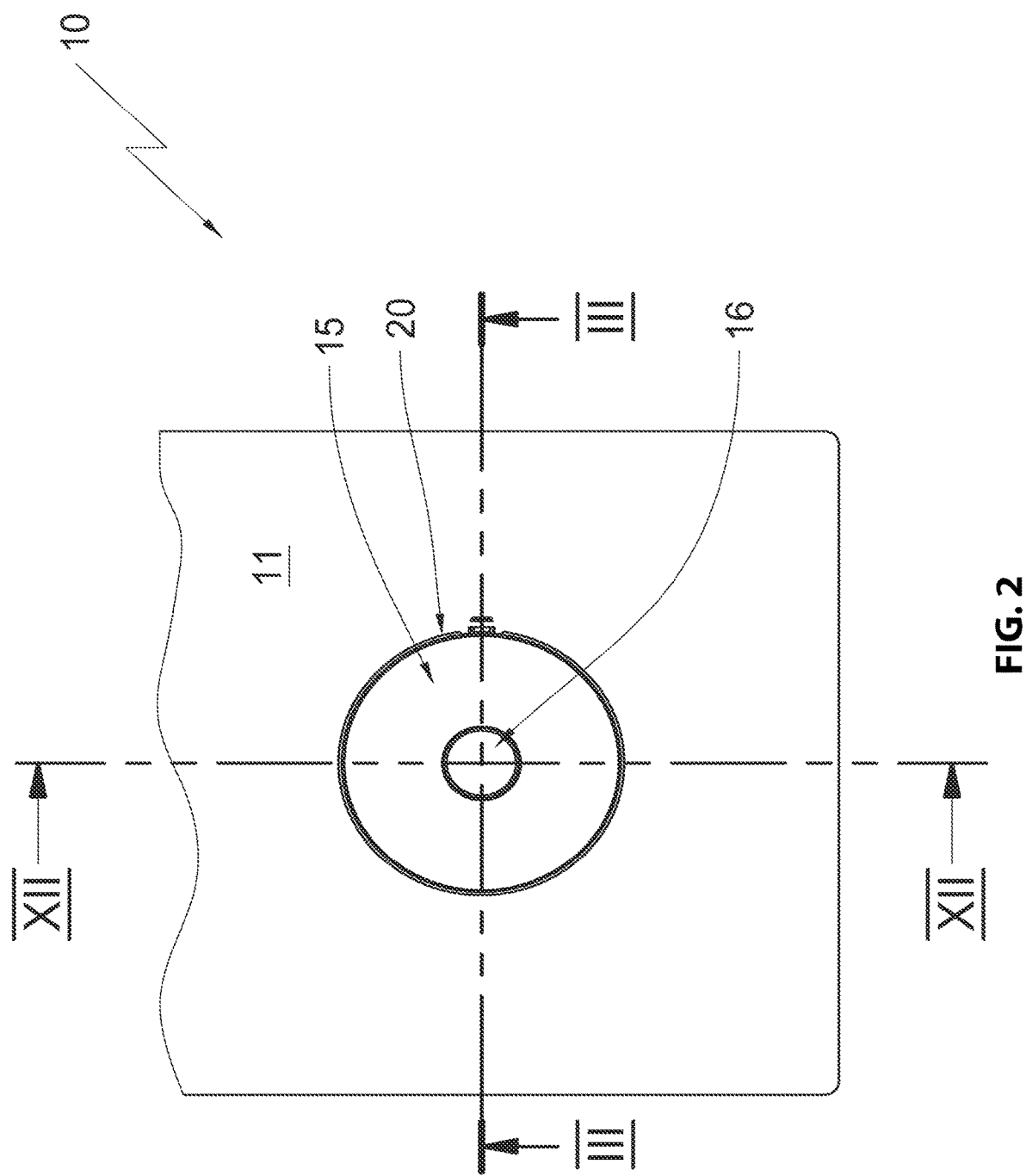
FIG. 2 illustrates a top view of the cooking appliance light according to FIG. 1.

FIGS. 3 and 12 show the arrangement 10 according to FIG. 1 in a mounted condition according to the sectional lines or XII-XII in FIG. 2. Both figures initially show the bore hole 16 of the mounting socket 15 that receives the light conductor rod 14 and the support chamber 43 for the graphite ring 17 that is formed by the mounting socket 15, wherein the graphite ring 17 seals the bore hole 16 relative to the light conductor rod 14 and thus prevents an exit of cooking vapors through the bore hole 16.

The mounting socket 15 forms a sealing collar 44 that forms a sealing groove 45 that is open in a direction towards the support plate 20 wherein the sealing elastic element 21 is arranged in the open sealing groove 45 and prevents an exit of cooking vapors through the annular cavity 28 past the mounting socket 15.

FIG. 3 shows how the support plate 20 is supported in the cut out 12, wherein the positioning lug 22 is inserted into the positioning groove 13. The free end of the positioning arm 26 is arranged in the plane of the cooking cavity wall 11. The locking lug 27 reaches behind the cooking cavity wall 11 and thus secures the support plate 20 at the cooking cavity wall 11 together with the mounting bases.

A function of the mounting bracket 18 is now further described with reference to FIG. 12. The mounting bracket 18 is secured at the mounting socket 15 by the retaining pins 19 which penetrate the retaining pin openings 33 and engage dead holes 46 of the mounting socket 15 so that the attachment bracket 18 supports the graphite ring 17 in the retaining chamber 43.

The interlocking arms 34 that are bent into a funnel shape and are oriented away from the bore hole 16 of the mounting socket 15, engage the alignment contours 29 of the support plate 20, wherein the support plate 20 is supported between the centering and interlocking section 35 of each interlocking arm 34 and the sealing collar 44 of the mounting socket 15. Thus, the interlocking arms 34 function as alignment devices 30 for the mounting socket 15.

A forming portion that is formed by the respective centering and interlocking section 35 of each interlocking arm 34 protrudes relative to an inner edge of the support plate 20 that forms the respective alignment contour 29 and thus functions as an interlocking protrusion that reaches behind the support plate 20. Slanted surfaces of the centering and interlocking section 35 align the support plate 20 relative to the mounting socket 15 and compensate for fabrication tolerances. Each fixing base 36 provides a pull-out safety for the support plate 20 at the mounting socket 15 and can additionally reach behind the cooking cavity wall 11 with a corresponding deflection so that the mounting plate is supported at the cooking cavity wall 11 in addition to the mounting bases 23 and the interlocking lug 27 of the positioning arm 26.

FIGS. 6-10 illustrate another embodiment of the invention. The exploded view according to claim 6 shows the arrangement 10 of the cooking cavity light represented by the light conductor rod 14 and a cut out portion of the cooking cavity wall 11 showing essential components. The cooking cavity wall 11 and the support plate 20 are essentially configured according to the first embodiment so that their descriptions provided supra also apply to the second embodiment.

In particular also the second embodiment includes a cut out 12 in the cooking cavity wall 11 wherein the cut out forms a positioning groove 13. The support plate 20 illustrated in FIGS. 9 and 10 in a perspective view from above or from below also includes a positioning lug 22 that is configured according to the first embodiment and support bases 23 that correspond to the first embodiment. Also, here the annular wall 24 forms an annular cavity 28, however an alignment contour 29 is omitted. Another significant difference from the first embodiment is an annular collar 37 that is formed by the annular wall 24 and that protrudes from the bottom side of the support plate 20.

Figure 6:
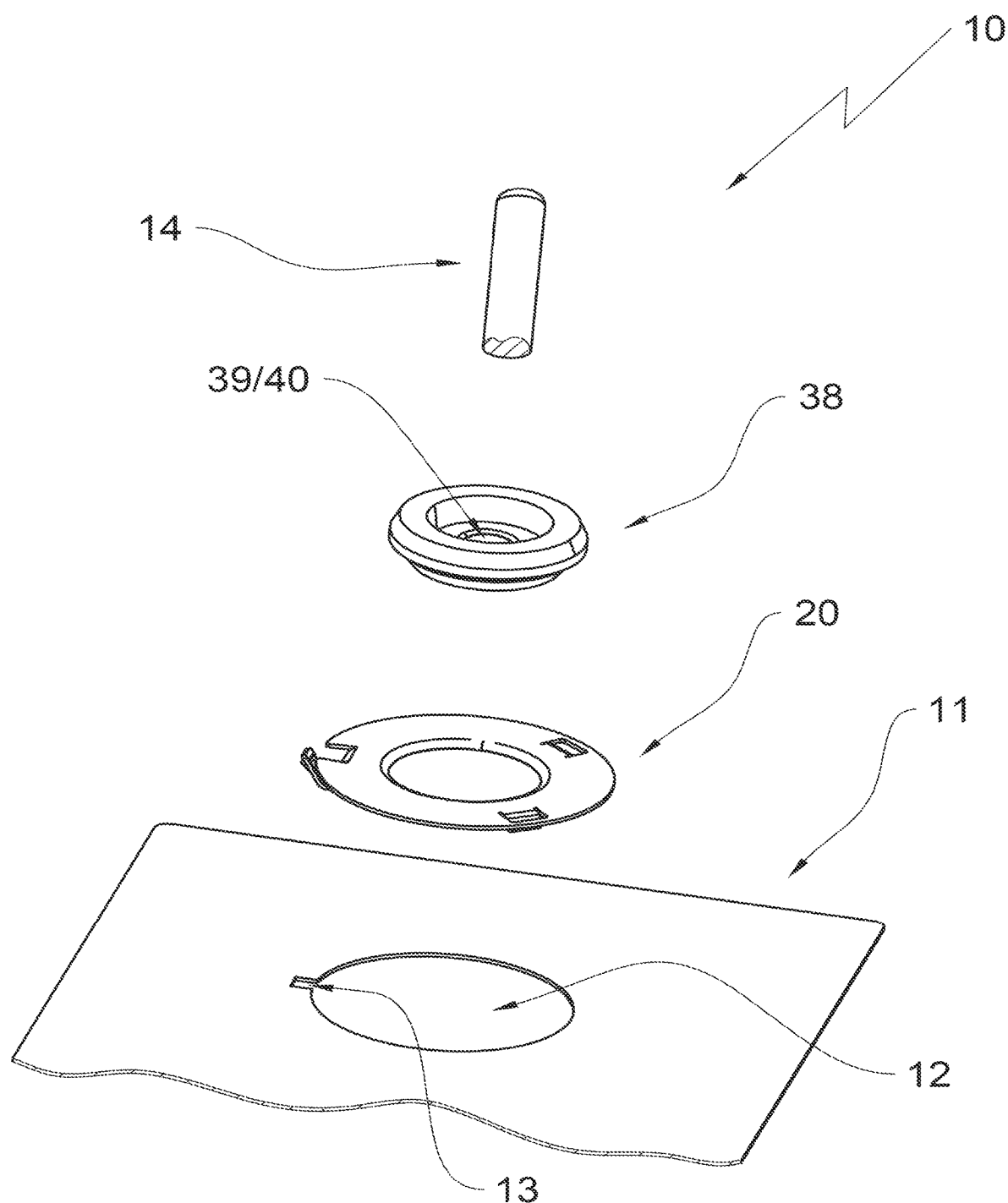
FIG. 6 illustrates a second embodiment of the invention.

The second embodiment of the invention according to FIG. 6 additionally includes a seal element 38 with a central cut out 39 that functions as a receiver 40 for the light conductor rod 14.

Figure 7:
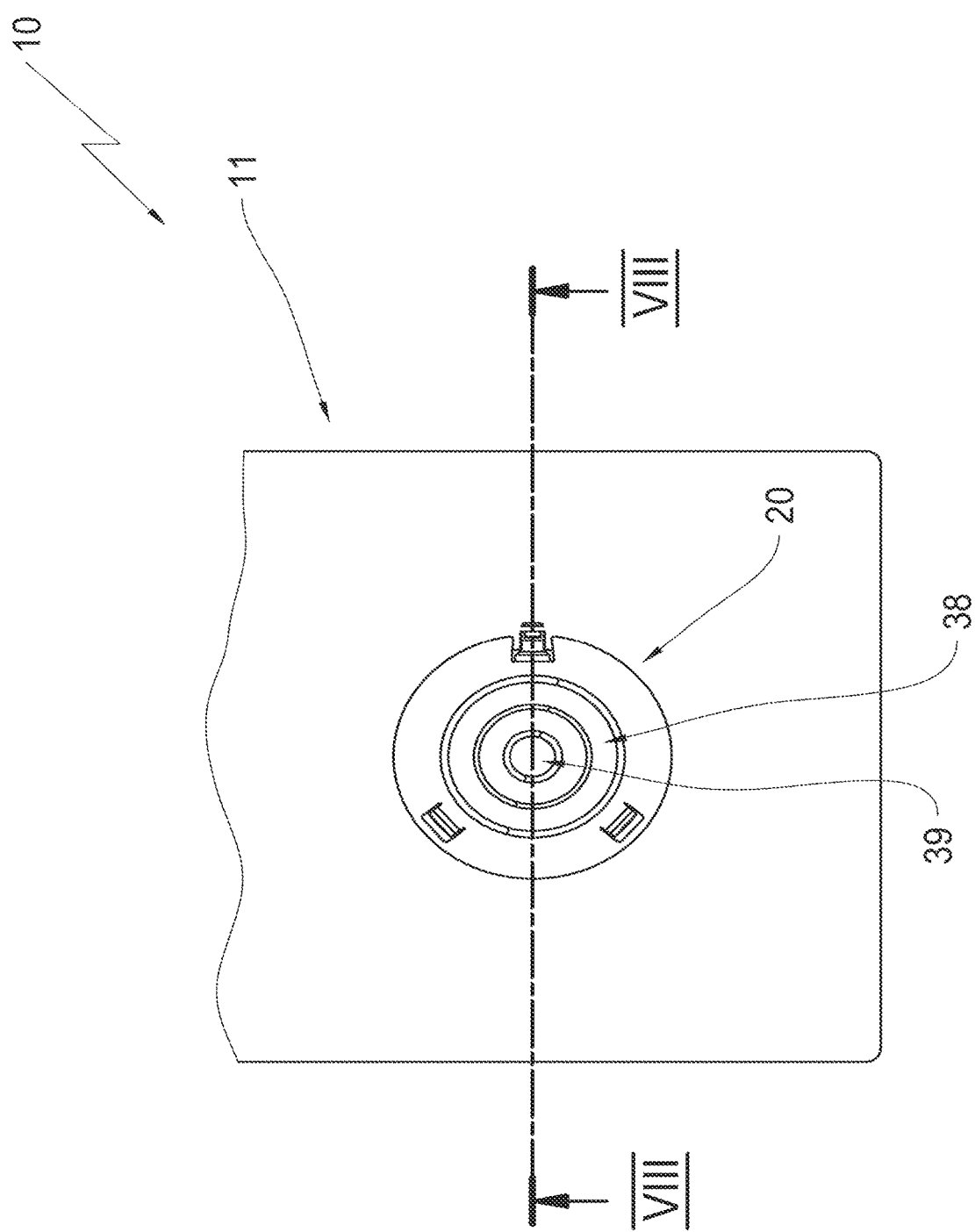
FIG. 7 illustrates a top view of the embodiment according to FIG. 6.
Figure 8:
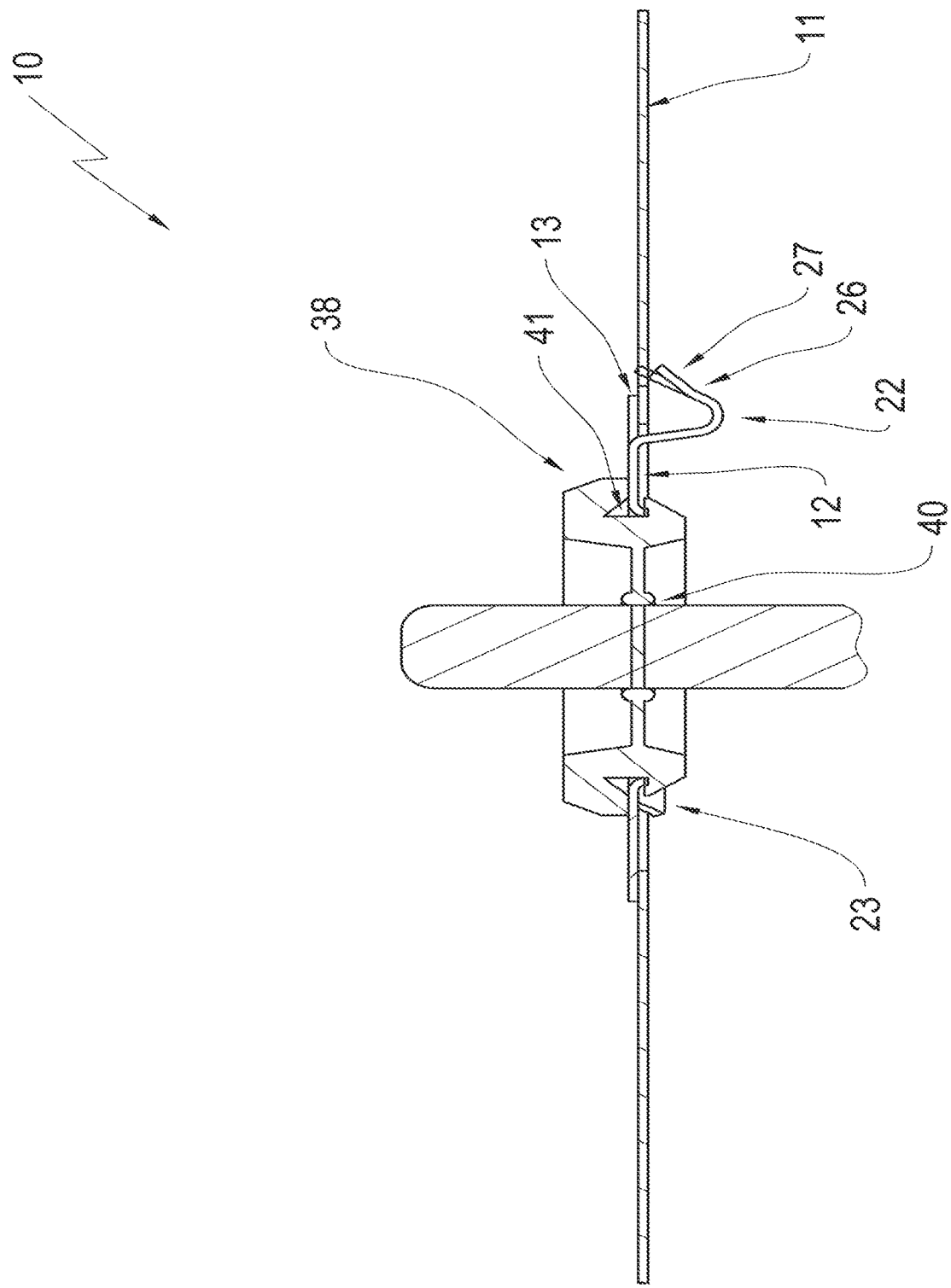
FIG. 8 illustrates a sectional view according to the section line VIII-VIII in FIG. 7.
Figure 10:
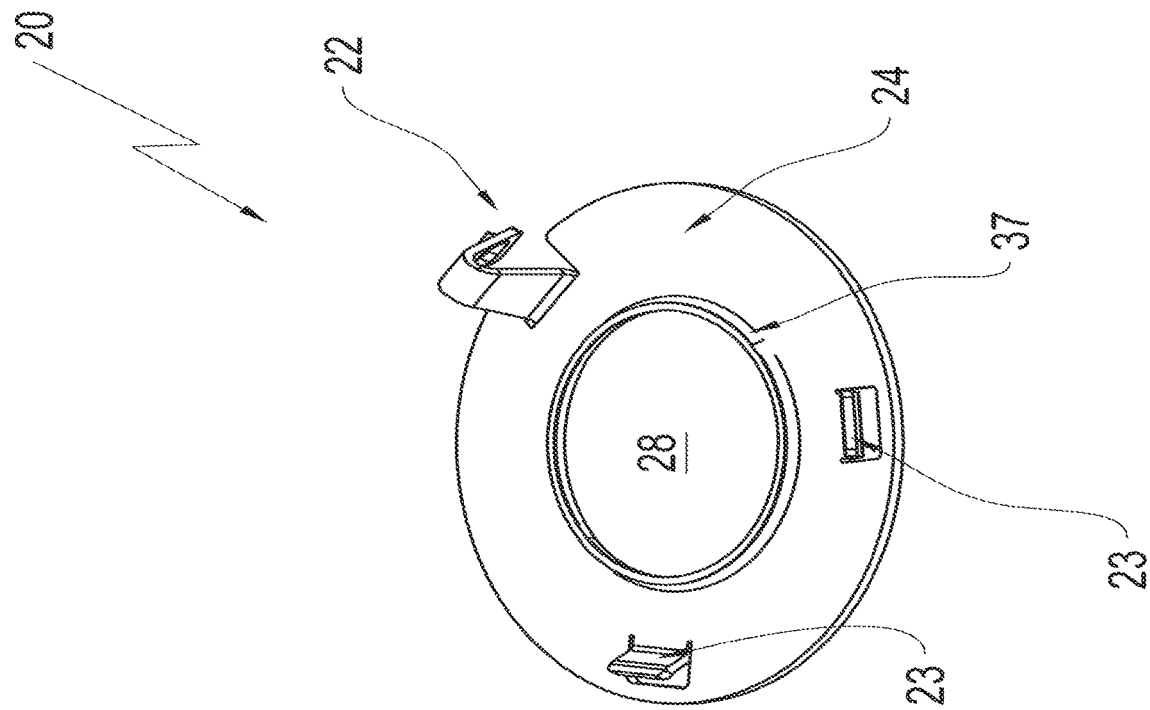
FIG. 10 illustrates the mounting plate according to FIG. 9 in a bottom view.
Figure 9:
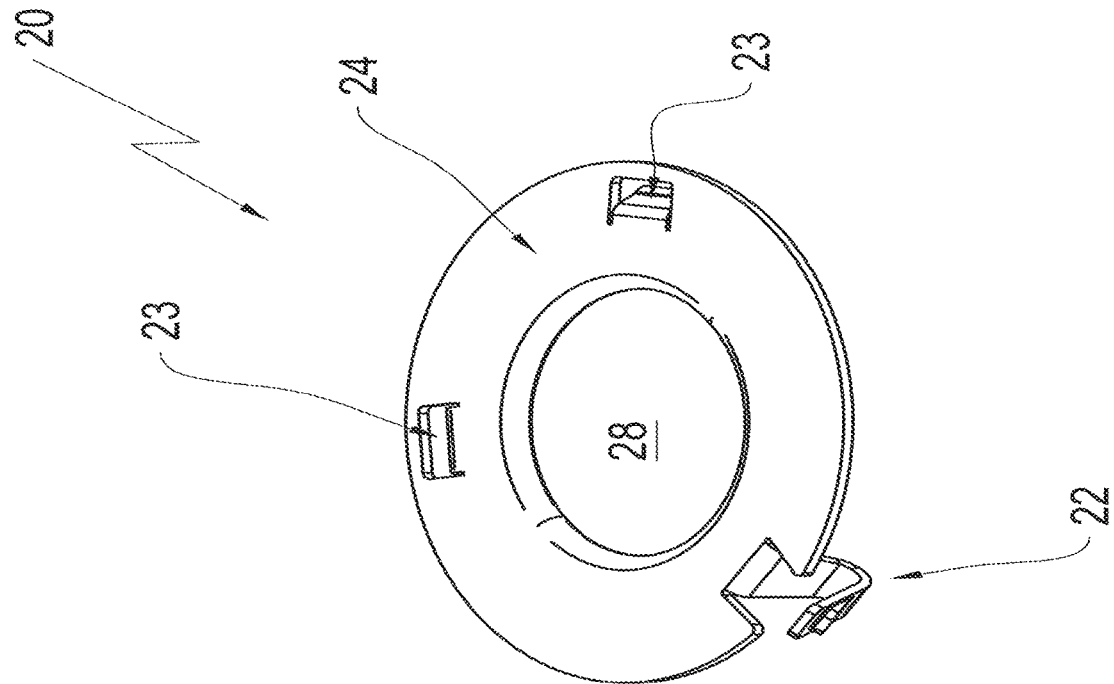
FIG. 9 illustrates a mounting plate according to the second embodiment in a top view.

FIG. 8 illustrates a sectional view according to the section line VIII-VIII in FIG. 7 and shows the arrangement of the second embodiment according to FIG. 6 in assembled condition. The seal element 38 is arranged in the annular cavity 28 of the support plate 20. A circumferential grove 41 formed on an outer circumference of the seal element 38 receives an edge of the annular wall 24 that defines the annular cavity 28 wherein the annular collar 37 is received in the annular groove 41.

The mounting plate 20 that receives the seal element 38 is inserted into the cut out 12 of the cooking cavity wall 11 wherein the support bases 23 reach behind the cooking cavity wall 11 and thus receive the cooking cavity wall 11 between themselves and the annular wall 24 that sits on the cooking cavity wall 11. The positioning lug 22 of the support plate 20 sits in the positioning groove 13 of the cut out 12 wherein the free end of the positioning arm 26 sits in the plane of the cooking cavity wall 11, whereas the interlocking lug 27 reaches behind the cooking cavity wall 11 and thus anchors the support plate 20 in the cut out 12. The light conductor rod 14 of the cooking appliance light sits in the receiver 40 of the seal element 38 and thus retains the cooking appliance light at the cooking cavity wall 11, which does not preclude additional fasteners in particular in a light portion that is oriented away from the free end of the light conductor rod.

Both embodiments show how a cooking cavity wall 11 with a cut out 12 for anchoring conventional cooking cavity lights with halogen or incandescent bulbs can be provided with a modern LED technology cooking cavity light using an adapted support plate 20. In particular a cooking appliance lights with a light conductor rod 14 only requires small cut outs 12 in the cooking cavity wall 11 in order to feed the light into the cooking cavity. The support plate 20 reduces the diameter of the cut out 12 to a size that is suitable for inserting a light conductor rod 14 possibly additionally using a mounting socket 15 or a seal element 38. Furthermore, the support plate 20 can be used to fix the cooking appliance light in the cooking appliance, in particular when the support plate 20 receives a mounting socket 15. Therefore, the support plate 20 is an adapter plate. The adapter plate facilitates using existing dies and tools and LED lights without having to adapt a configuration of the LED lights to instant installation conditions.

Thus, it is a key feature of the invention to provide a suitable feed for the light conductor rod 14 by reducing dimensions of an oversized cut out of the cooking cavity wall 11 by using the support plate 20 for passing the light conductor rod 14 through.

Though the preceding description shows circular cut outs 12 and a circular adaptor plate 20, the key feature of the invention is also suitable for less common rectangular or otherwise shaped cut outs by adapting the shape of the support plate 20 and a shape of the seal element 38 or the mounting socket 15. In addition to circular cylindrical light conductor rods, also rectangular or oval light conductor rods and light conductor rods with non-symmetrical cross sections are known. The teachings of the inventions can also be adapted to these light conductor rods.

REFERENCE NUMERALS AND DESIGNATIONS 10 arrangement with cooking appliance light
11 cooking cavity wall
12 cut out
13 positioning groove
14 light conductor rod, cooking appliance light
15 mounting socket
16 bore hole
17 graphite ring
18 mounting bracket
19 retaining pin
20 support plate
21 sealing elastic element
22 positioning lug
23 mounting base
24 annular wall
25 originating arm
26 positioning arm
27 interlocking lug
28 annular cavity
29 alignment contour
30 alignment device
31 base bar
32 pass-through opening
33 retaining pin opening
34 interlocking arm
35 centering and interlocking section
36 fixing base
37 annular collar
38 seal element
39 cut out
40 receiver
41 annular groove
42 undercut
43 mounting bracket
44 sealing collar
45 sealing groove
46 dead hole
47 receiving opening
48 cooking appliance light
49 LED illuminant

What is claimed is:

1. A cooking appliance, comprising:
a cooking cavity defined by a cooking cavity wall;
a cut out provided in the cooking cavity wall;
a cooking appliance light arranged in the cut out and configured to illuminate the cooking cavity; and
a support plate including a receiving opening for the cooking appliance light,
wherein the cooking appliance light is supported in the receiving opening,
wherein the support plate fixes the cooking appliance light in the cut out,
wherein the support plate including the cooking appliance light closes the cut out in the cooking cavity wall,
wherein the cooking appliance light includes a LED illuminant and a light conductor rod,
wherein the light conductor rod is supported in the cut out in the cooking cavity wall, and
wherein the cut out forms a positioning groove in the cooking cavity wall and the support plate forms a positioning lug that engages the positioning groove.

2. The cooking appliance according to claim 1, wherein the positioning lug of the support plate includes at least one interlocking lug that reaches behind the cooking cavity wall.

3. The cooking appliance according to claim 2, wherein the support plate includes at least one mounting base that reaches behind the cooking cavity wall.

4. The cooking appliance according to claim 3, wherein the support plate includes an alignment contour configured to position the cooking appliance light in the support plate.

5. The cooking appliance according to claim 3,
wherein the support plate is a stamped component, and
wherein the mounting base and the positioning lug are bent from the material of the support plate.

6. The cooking appliance according to claim 5, wherein the cooking appliance light includes a mounting socket that fixes the cooking appliance light in the support plate.

7. The cooking appliance according to claim 6, wherein an elastic ring is arranged between the mounting socket and the support plate and has a sealing effect.

8. The cooking appliance according to claim 7, wherein the support plate includes a seal element including a receiver for the light conductor rod of the cooking appliance light.

9. The cooking appliance according to claim 3,
wherein the support plate is configured annular and includes two mounting bases and the positioning lug, and
wherein the mounting bases and the positioning lug bare respectively circumferentially offset from each other by approximately 120 degrees.

\* \* \* \* \*